United States Patent
Konishi et al.

(10) Patent No.: US 7,354,975 B2
(45) Date of Patent: Apr. 8, 2008

(54) CHLORINATED POLYOLEFINS AND PROCESS FOR THEIR PRODUCTION

(75) Inventors: Jun Konishi, Kawasaki (JP); Atsushi Sugawara, Kawasaki (JP); Yutaka Mitsunaga, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 244 days.

(21) Appl. No.: 10/528,054

(22) PCT Filed: Sep. 12, 2003

(86) PCT No.: PCT/JP03/11743

§ 371 (c)(1),
(2), (4) Date: Mar. 17, 2005

(87) PCT Pub. No.: WO2004/026916

PCT Pub. Date: Apr. 1, 2004

(65) Prior Publication Data

US 2006/0047087 A1     Mar. 2, 2006

Related U.S. Application Data

(60) Provisional application No. 60/412,793, filed on Sep. 24, 2002.

(30) Foreign Application Priority Data

Sep. 18, 2002 (JP) ............................. 2002-271073

(51) Int. Cl.
*C08F 8/18* (2006.01)

(52) U.S. Cl. ................... 525/334.1; 525/355; 525/356

(58) Field of Classification Search ............ 525/334.1, 525/355, 356
See application file for complete search history.

(56) References Cited

U.S. PATENT DOCUMENTS

| 3,856,766 A | * | 12/1974 | Klug et al. | 525/358 |
| 4,473,451 A | * | 9/1984 | Benedikt et al. | 522/3 |
| 4,593,075 A | * | 6/1986 | Rifi | 525/356 |
| 4,767,823 A | * | 8/1988 | Jones et al. | 525/334.1 |

FOREIGN PATENT DOCUMENTS

| AU | 490384 B | | 3/1976 |
| DE | 1 595 194 A | | 4/1970 |
| EP | 0 103 703 A2 | | 3/1984 |
| EP | 0 131 937 A1 | | 1/1985 |
| EP | 0 928 673 A1 | | 7/1999 |
| GB | 2 198 136 A | | 6/1988 |
| GB | 2 239 457 A | | 7/1991 |
| JP | 05-009332 | * | 1/1993 |
| JP | 8-59737 A | | 3/1996 |
| WO | WO 86/03499 A1 | | 6/1986 |

OTHER PUBLICATIONS

Dong-ho Lee, Polymeric Materials Encyclopedia, CRC press, vol. 6, 4734-4740(1996).*

* cited by examiner

*Primary Examiner*—Ling-Sui Choi
(74) *Attorney, Agent, or Firm*—Sughrue Mion, PLLC

(57) ABSTRACT

Uniform chlorinated polyolefins which can give crosslinked rubbers and thermoplastic elastomers with excellent low-temperature rubber elasticity, compression set and fatigue strength, and a process for their production. Polyolefin powder pulverized to a mean particle size of no greater than 500μ is used for chlorination.

20 Claims, No Drawings

CHLORINATED POLYOLEFINS AND PROCESS FOR THEIR PRODUCTION

CROSS-REFERENCE TO RELATED APPLICATION

This application is an application filed under 35 U.S.C. § 111(a) claiming benefit pursuant to 35 U.S.C. § 119(e)(1) of the filing date of the Provisional Application 60/412,793 filed Sep. 24, 2002, pursuant to 35 U.S.C. § 111(b).

TECHNICAL FIELD

The present invention relates to chlorinated polyolefins and to a process for their production. In particular, the invention relates to chlorinated polyolefins which are suitable as starting materials for crosslinked rubber and thermoplastic elastomer having not only excellent oil resistance, heat resistance and the like, but also excellent low-temperature rubber elasticity and compression set, and to a process for their production.

BACKGROUND ART

Chlorinated polyolefins are chlorinated compounds obtained by chlorination of polyolefins such as polyethylene. Chlorinated polyolefins are commonly used as modifiers for ABS resins or polyvinyl chloride resins or as wire sheaths, but in recent years they are also coming into wider use as crosslinked rubbers or thermoplastic elastomers for automobile parts and industrial parts.

Because of the oil resistance, solvent resistance, weather resistance and flexibility characteristic of chlorinated polyolefins, they are also used as hoses or sheets, packings, automobile constant velocity universal joint boots and the like. Such uses also require additional properties such as satisfactory heat resistance, ozone resistance, low-temperature rubber elasticity, compression set and fatigue strength.

Chlorinated polyolefins have conventionally been produced by chlorinating polyolefin powder in aqueous suspension while controlling the reaction temperature, chlorine content, etc. Various proposals have been set forth for such aqueous suspension methods, in order to obtain a uniform chlorinated polyolefin powder and in order to prevent agglomerating during the chlorinated reaction and maintain the powder particle size.

Surfactants or inorganic substances are commonly added as anti-aggregation agents in order to prevent agglomerating of particles during the reaction. On the other hand, when a copolymer of ethylene and an α-olefin is used as the starting material, a higher proportion of the α-olefin tends to result in lower crystallinity, and the increased number of free chains promotes agglomerating during the chlorination reaction. A production method known as a solution to this problem comprises a first step of chlorination at a temperature lower than the crystal melting point of the polyolefin starting material, a second step of heat treatment in the absence of chlorine at a temperature higher than the crystal melting point, and a third step of chlorination up to the final chlorine content at a temperature below the temperature of the second step and below the crystal melting point (see, for example, Japanese Unexamined Patent Publication No. 3-66325).

However, the effect of satisfactorily preventing agglomerating and maintaining the powder particle size depends on preventing unwanted crystal residue or a relatively poor level of non-uniformity, and it has been difficult to achieve uniform chlorinated polyolefins with excellent properties by the method described above.

It is also well known that polymerized polyolefin powder has a given range of particle size distribution and that differences in molecular weight and density are found between the particle sizes. The uniformity of a chlorinated polyolefin depends primarily on the uniformity of the polyolefin starting material, and methods are known for obtaining uniform chlorinated polyethylene by adjusting the particle size of the polyolefin starting material (see, for example, Japanese Unexamined Patent Publication No. 8-59737).

However, while improvement toward a more uniform product is achieved by narrowing the particle size distribution of the polyolefin powder, the more serious problem of variation within each particle is not affected, and these obtained chlorinated polyolefins therefore remain unsatisfactory in several of their properties.

DISCLOSURE OF INVENTION

It is therefore an object of the present invention to provide uniform chlorinated polyolefins which can give crosslinked rubbers and thermoplastic elastomers with excellent low-temperature rubber elasticity, compression set and fatigue strength, and a process for their production.

As a result of much diligent research directed toward solving the aforementioned problems, the present inventors have completed the present invention based on the discovery that these problems can be overcome by employing a production process wherein polyolefin powder having a mean particle size of no greater than 500 μm, obtained by pulverizing a melted and kneaded solid, is used as the starting material for chlorination.

Thus, the invention relates to the following (1) to (17).

(1) A process for production of a chlorinated polyolefin comprising a step of melting and kneading a polyolefin and then molding it to obtain a solid, a step of pulverizing the solid into powder having a mean particle size of no greater than 500 μm, and a step of chlorinating the powder.

(2) A process for production of a chlorinated polyolefin according to (1) above, wherein the chlorinating step further comprises a first step of chlorination at above the crystal melting start temperature and more than 10° C. below the crystal melting peak temperature of the polyolefin starting material as determined by DSC, a second step of interrupting the chlorine supply and performing heat treatment by heating to a temperature which is higher than 5° C. below the crystal melting peak temperature, and a third step of rechlorination at a temperature above the crystal melting start temperature of the chlorinated polyolefin after the heat treatment step.

(3) A process for production of a chlorinated polyolefin according to (1) or (2) above, wherein the polyolefin is polyethylene.

(4) A process for production of a chlorinated polyolefin according to (3) above, wherein the polyethylene is linear low-density polyethylene.

(5) A process for production of a chlorinated polyolefin according to (3) or (4) above, wherein the density of the polyethylene is 0.90-0.93.

(6) A process for production of a chlorinated polyolefin according to any one of (3) to (5) above, wherein the polyethylene is polyethylene with a weight-average molecular weight (Mw) and number-average molecular weight (Mn) ratio (Mw/Mn) of no greater than 3.0 as measured by gel permeation chromatography.

(7) A chlorinated polyolefin produced by a process according to any one of (1) to (6) above, wherein the chlorinated polyolefin has a crystal heat of fusion of no greater than 30 J/g according to DSC.

(8) A chlorinated polyolefin according to (7) above, wherein the chlorine content is 15-45 wt %.

(9) A chlorinated polyolefin according to (7) or (8) above, wherein the elongation based on a tensile test is 1500% or greater, and the glass transition temperature is no higher than −25° C.

(10) A chlorinated polyolefin according to any one of (7) to (9) above, wherein the chlorinated polyolefin is chlorinated polyethylene.

(11) A chlorinated polyolefin crosslinkable composition comprising 100 parts by weight of a chlorinated polyolefin according to any one of (7) to (10) above, 0.5-20 parts by weight of an acid acceptor, 10-80 parts by weight of a reinforcer, 0.5-10 parts by weight of a crosslinking agent and 5-70 parts by weight of a plasticizer.

(12) A crosslinked chlorinated polyolefin obtained by crosslinking a chlorinated polyolefin crosslinkable composition according to (11) above.

(13) A crosslinked chlorinated polyolefin according to (12) above, wherein the temperature at which the relative modulus (RM)=2 by a cold flex test is no higher than −25° C.

(14) A crosslinked chlorinated polyolefin according to (12) above, wherein the temperature at which the relative modulus (RM)=5 by a cold flex test is no higher than −40° C.

(15) A crosslinked chlorinated polyolefin according to (12) above, wherein the temperature at which the relative modulus (RM)=10 by a cold flex test is no higher than −45° C.

(16) An automobile boot or hose employing a crosslinkable composition or crosslinked polyolefin according to any one of (11) to (15) above.

(17) An industrial hose, sheet or packing employing a crosslinkable composition or crosslinked polyolefin according to any one of (11) to (15) above.

According to the present invention it is possible to provide chlorinated polyolefins which can be used as starting materials for crosslinked rubbers and thermoplastic elastomers exhibiting excellent low-temperature rubber elasticity, compression set and fatigue strength, which are particularly useful in the fields of automobiles, household electrical appliances, building materials and the like.

BEST MODE FOR CARRYING OUT THE INVENTION

The chlorinated polyolefin production process of the invention is characterized by comprising a step of melting and kneading a polyolefin and then molding it to obtain a solid, a step of pulverizing the solid into powder having a mean particle size of no greater than 500 μm, and a step of chlorinating the powder.

Specifically, the production process is characterized by melting and kneading polyolefin powder or pellets, and then molding this into a solid which is then pulverized to a mean particle size of no greater than 500 μm to prepare a powder to be used as a starting material.

Here, the "solid" referred to here may be pellets, beads or the like obtained by melting, kneading and molding, and although the size and shape or the like are not particularly restricted, a smaller size is preferred because of the pulverization in the subsequent step. If the mean particle size, represented as the 50% particle size based on weight, of the polyolefin powder used in the chlorination step of the process of the invention is greater than 500 μm, the low-temperature rubber elasticity will be impaired.

The step of melting and kneading the polyolefin starting material and molding it into a solid is usually carried out using an extruder or the like, but there are no particular restrictions on the method so long as one or more starting materials selected from among powder obtained from a polyolefin production process and already melted, kneaded and molded solids, are first melted and subjected to a step of physical shearing followed by cooling to hardness to achieve the desired homogeneity of the molding material.

The melting and kneading of the polyolefin may also be carried out by an ordinary method, and it will generally be conducted at or above the melting point of the polyolefin, but here as well, the process and conditions are not particularly restricted so long as the desired homogeneity of the molding material can be achieved.

The pulverization of the obtained solid is not particularly restricted, although a shearing-type pulverizer is more suitable for pulverization of polyolefins than an impact-type pulverizer, and there are no particular restrictions on the method or type of pulverizer used so long as the mean particle size of the powder after pulverization is no greater than 500 μm.

As examples of polyolefins to be used for the invention there may be mentioned α-olefin homopolymers of ethylene, propylene, butene-1, pentene-1, hexene-1, octene-1,4-methylpentene-1 and the like, and copolymers of ethylene and α-olefin or copolymers of 2 or more different α-olefins which are crystalline polymers. Such copolymers include random and block copolymers. The polyolefins may be powders obtained from a production process or pellets obtained by prior melting and kneading, and two or more different polyolefins may be used in admixture for the melting and kneading.

The polyolefin is preferably polyethylene. Polyethylene for the purpose of the invention includes not only ethylene homopolymer but also ethylene copolymer copolymerized with an α-olefin, such as medium-density or linear low-density polyethylene. The polyethylene is preferably linear low-density polyethylene, and the density of the polyethylene is preferably 0.90-0.93. Also, the polyethylene preferably has a weight-average molecular weight (Mw) and number-average molecular weight (Mn) ratio (Mw/Mn) of no greater than 3.0 as measured by gel permeation chromatography. The Mw/Mn ratio is more preferably between 1.0 and 2.9, and especially between 1.5 and 2.8. If the Mw/Mn ratio is less than 1.0 the workability may be reduced, and if it exceeds 3.0 the mechanical strength may be reduced.

As examples of polyolefins satisfying the conditions described above there may be mentioned those obtained by polymerization using a metallocene catalyst comprising a metallocene compound of a transition metal selected from Group IVB of the Periodic Table, and an organic aluminoxy compound. As examples of transition metals selected from Group IVB of the Periodic Table there may be mentioned zirconium, titanium, hafnium and the like. As examples of organic aluminoxy compounds there may be mentioned conventional known aluminoxanes obtained by reaction conducted by adding an organic aluminum compound such as trialkylaluminum to a compound containing water of adsorption or a salt containing water of crystallization, for example, aluminum sulfate hydrate or magnesium chloride hydrate suspended in an aromatic hydrocarbon solvent, although there is no restriction to such compounds.

The step of chlorination of the powder preferably comprises a first step of chlorination at above the crystal melting start temperature and more than 10° C. below the crystal melting peak temperature of the polyolefin starting material as determined by DSC, a second step of interrupting the chlorine supply and performing heat treatment by heating to a temperature which is higher than 5° C. below the crystal melting peak temperature, and a third step of rechlorination at a temperature above the crystal melting start temperature of the chlorinated polyolefin after the heat treatment step.

In the first step of chlorination, chlorination at a temperature below the crystal melting start temperature will tend to promote non-uniformity of chlorination and the resulting chlorinated polyolefin will sometimes lack flexibility. On the other hand, chlorination at a temperature more than 10° C. below the crystal melting peak temperature is preferred. Chlorimation at a higher temperature will tend to promote aggregation and agglomerating of the reacting particles, resulting in non-uniform chlorination and often yielding a product with unsatisfactory elongation or low-temperature properties. Likewise, the heating in the second step at a temperature exceeding 5° C. below the crystal melting peak temperature is preferred. If the heating is carried out at a lower temperature, the crystals will tend to remain, often not only making it difficult to obtain amorphous chlorinated polyethylene but also resulting in non-uniformity even if crystalline chlorinated polyethylene is obtained. Similarly, chlorination in the third step at a temperature below the crystalline melting start temperature of the chlorinated polyolefin after the heat treatment step will also tend to result in residue of the crystals, often not only making it difficult to obtain amorphous chlorinated polyethylene but also resulting in non-uniformity even if crystalline chlorinated polyethylene is obtained.

The chlorination step is preferably conducted so that the final chlorine content in the first step is no greater than 90%.

For chlorination by an aqueous suspension method, there may be added conventional known agents, such as a dispersing agent to wet the polyolefin powder and disperse it in water, or an anti-agglomerating agent added either before or during the reaction for the purpose of preventing aggregation of the reaction particles during the chlorination reaction.

As examples of dispersing agents there may be mentioned anionic surfactants such as alkylbenzenesulfonates, alkylnaphthalenesulfonates, alkyldiphenylether sulfonates, dialkylsulfosuccinates, alkylphosphates, alkylsulfuric acid esters, naphthalenesulfonate formalin condensates and polyoxyethylenealkylsulfuric acid esters, nonionic surfactants such as sorbitan fatty acid esters, polyoxyethylene sorbitan fatty acid esters, polyoxyethylene alkylallyl ethers, polyoxyethylenealkyl ethers and oxyethylene-oxypropylene block polymers, or polyvinyl alcohol, carboxymethylcellulose, starch, gelatin or the like.

As examples of anti-agglomerating agents there may be mentioned protective colloids such as polyacrylic acid, copolymers of maleic anhydride and styrene or methylvinyl ether, or polyacrylamide, polyvinylpyrrolidone, or the like, surfactants such as polystyrenesulfonate, sodium alkylallylsulfonate formalin condensate, diphenylmethylenesulfonic acid formalin condensate, isobutylene-styrene copolymer sulfonic acid ester, β-naphthalenesulfonate formalin condensate and polyacrylates, or inorganic powders such as talc or silica.

The crystals of the chlorinated polyolefin obtained by the production process of the invention preferably have a crystal heat of fusion of no greater than 30 J/g and more preferably no greater than 20 J/g according to DSC. The low-temperature rubber elasticity may be impaired when the heat of fusion according to DSC exceeds 30 J/g.

DSC is a method of measurement using a differential scanning calorimeter (JIS K7121 and K7122).

The chlorine content of the obtained chlorinated polyolefin is preferably 15-45 wt %, more preferably 20-40 wt % and even more preferably 25-35 wt %. If the chlorine content is less than 15 wt % or above 45 wt %, the rubber elasticity, and especially the low-temperature rubber elasticity, may be impaired.

The elongation of the chlorinated polyolefin based on a tensile test is preferably 1500% or greater and more preferably 1600% or greater, and the glass transition temperature is preferably no higher than −25° C.

A chlorinated polyolefin obtained by the production process of the invention may be crosslinked as crosslinked rubber by being used in a composition comprising basically an acid acceptor, a reinforcer, a crosslinking agent and a plasticizer. The crosslinking may be accomplished by an ordinary method employing, for example, a press, injection molder, vulcanizer, hot air furnace or the like, selected as appropriate depending on the composition and the purpose of use.

The acid acceptor may be any one ordinarily used with chlorinated polyolefins. As examples there may be mentioned oxides or hydroxides of calcium, magnesium and the like, or synthetic hydrotalcite, synthetic zeolite or the like. These acid acceptors may be used alone or in combinations of two or more. The acid acceptor may be used in a proportion of 0.5-20 parts by weight and preferably 1-15 parts by weight to 100 parts by weight of the chlorinated polyolefin. If the acid acceptor is used at less than 0.5 part by weight the acid accepting function will be insufficient, while if it is used at greater than 20 parts by weight the obtained crosslinked rubber may have inferior mechanical strength.

As examples of reinforcers there may be mentioned carbon black, silica, calcium carbonate, talc, clay or the like. These may be used alone or in combinations of two or more. The reinforcer may be used in a proportion of 10-80 parts by weight and preferably 20-60 parts by weight to 100 parts by weight of the chlorinated polyolefin. If the reinforcer is used at less than 10 parts by weight the obtained crosslinked rubber may have inferior mechanical strength, while if it is used at greater than 80 parts by weight the flexibility may be impaired.

As examples of crosslinking agents there may be mentioned mercaptotriazine-based compounds, mercaptobenzothiadiazole-based compounds, organic peroxides and the like.

As examples of mercaptotriazine-based compounds there may be mentioned 2,4,6-trimercapto-1,3,5-triazine, 1-methoxy-3,5-dimercaptotriazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine and 1-phenylamino-3,5-dimercaptotriazine.

Crosslinking accelerators may also be used in combination with these mercaptotriazine-based compounds. As examples there may be mentioned basic accelerators such as basic amine compounds, basic amine organic acid salts or addition products or diarylguanidine, sulfenamide accelerators, thiuram accelerators, and the like.

As examples of mercaptobenzothiadiazole compounds there may be mentioned 2,5-dimercapto-1,3,4-thiadiazole, 5-mercapto-1,3,4-thiadiazole-2-thiobenzoate, 1,3,4-thiadiazolyl-2,5-dithiobenzoate, 5-mercapto-1,3,4-thiadiazole-2-thiostearate, 5-mercapto-1,3,4-thiadiazole-2-thio-1-naphthoate, 5-mercapto-1,3,4-thiadiazole-2-thiophenylacetate, 5-mercapto-1,3,4-thiadiazole-2-thiocyclohexylcarboxylate, 5-mercapto-1,3,4-thiadiazole-2-thio-p-toluate, 5-mercapto-1,3,4-thiadiazole-2-thiocinnamate, 2,5-di(butoxymethyl)-1,3,4-thiadiazole, 2,2'-dimercapto-5,5'-dithiobis(1,3,4-thiadiazole) and 2,2'-di(butoxymethyl)-5,5'-dithiobis(1,3,4-thiadiazole).

As examples of organic peroxides there may be mentioned ketone peroxide, peroxyketal, hydroperoxide, dialkyl peroxides, diacyl peroxide, peroxy esters and peroxy dicarbonate, and as specific examples there may be mentioned 1,1-bis(t-butylperoxy)-3,3,5-trimethylcyclohexane, dicumyl peroxide, 2,5-dimethyl-2,5-di(t-butylperoxy)hexane, n-butyl-4,4-bis(t-butylperoxy)valerate and α,α'-bis(t-butylperoxy-m-isopropyl)benzene. These organic peroxides may be used alone or in combinations of two or more.

Crosslinking aids may also be used in combination with these organic peroxides. As examples of useful crosslinking aids there may be mentioned diallyl phthalate monomer, triallyl cyanurate, triallyl isocyanurate, ethyleneglycol dimethacrylate, trimethylpropane trimethacrylate and N,N'-m-phenylenebismaleimide. These coagents may also be used alone or in combinations of two or more.

The crosslinking agent may be used in a proportion of 0.5-10 parts by weight and preferably 1-5 parts by weight to 100 parts by weight of the chlorinated polyolefin. If the crosslinking agent is used at less than 0.5 part by weight, crosslinking may be insufficient making it impossible to achieve the intended crosslinked rubber properties. If it is used at greater than 10 parts by weight, the viscosity may increase during working, not only constituting a hindrance for molding but also resulting in inferior flexibility of the obtained crosslinked rubber.

As examples of plasticizers there may be mentioned phthalic esters such as dibutyl phthalate, diethyl phthalate, diheptyl phthalate, di-2-ethylhexyl phthalate, di-n-octyl phthalate and dinonyl phthalate, aliphatic dibasic acid esters such as dimethyl adipate, diisobutyl adipate, dibutyl adipate, di-2-ethylhexyl adipate, diisodecyl adipate, dibutyldiglycol adipate, di-2-ethylhexyl azelate, dimethyl sebacate, dibutyl sebacate, di-2-ethylhexyl sebacate and methylacetyl ricinoleate, and phosphoric acid esters such as trimethyl phosphate, triethyl phosphate, tributyl phosphate, tri-2-ethylhexyl phosphate, tributoxyethyl phosphate, trioleyl phosphate, triphenyl phosphate, tricresyl phosphate, trixylenyl phosphate, cresyldiphenyl phosphate, xylenyldiphenyl phosphate and 2-ethylhexyldiphenyl phosphate. These plasticizers may also be used alone or in combinations of two or more.

The plasticizer may be used in a proportion of 5-70 parts by weight and preferably 10-60 parts by weight to 100 parts by weight of the chlorinated polyolefin. If the plasticizer is used at less than 5 parts by weight the plasticizing effect may be inadequate, while if it is used at greater than 70 parts by weight bleeding of the plasticizer may occur.

In addition to the basic composition described above, other components may be appropriately added as necessary, such as stabilizers, flame retardants, pigments, antioxidants, ultraviolet absorbers, processing aids and the like, which are commonly used in crosslinked rubbers and plastics.

In a cold flex test described in JIS K6261-1993 (Vulcanized Rubber Cold Flex Test), the temperatures at which the relative modulus (RM) of the obtained crosslinked rubber is 2, 5 and 10 ($t_2$, $t_5$ and $t_{10}$) are $\leq -25°$ C., $\leq -40°$ C. and $\leq -45°$ C., respectively, and preferably $\leq -27°$ C., $\leq -43°$ C. and $\leq -49°$ C., respectively. The relative modulus is the value with respect to the modulus at ordinary temperature (23±2° C.), and these values are the temperatures for a 2-fold, 5-fold and 10-fold modulus, respectively. A lower temperature here reflects a lower hardening temperature and thus more excellent low-temperature properties as rubber, and it is common practice to select materials with reference to $t_2$, $t_5$ or $t_{10}$ depending on the purpose of use and the type of member. The numerical values are determined either from the modulus or the twist angle at numerous points as measured continuously from a low temperature; a difference of 2-3° C. in the relative modulus thus means a higher modulus at each temperature in the low-temperature range and therefore higher rigidity at low temperatures, and is therefore generally considered to be a major difference in terms of practical use.

The obtained crosslinked rubber maintains the heat resistance of conventional chlorinated polyolefin-based crosslinked rubber, while exhibiting a satisfactory balance between excellent low-temperature rubber elasticity and high mechanical fatigue strength and compression set, and it is therefore suitable for purposes including automobile parts, for example, boots such as constant velocity universal joint boots and hoses such as air cleaner hoses, or for industrial uses, for example, as hoses, sheets, packings and the like.

The present invention will now be explained in greater detail through examples and comparative examples, with the understanding that the invention is in no way limited by these examples.

The mean particle size was determined by measuring the filtered weight fraction by the Ro-Tap method using a wire sieve according to JIS Z8801, and recording the mean particle size as the particle size with a 50% cumulative weight percentage.

The melt flow rate (MFR) was measured at 190° C., according to JIS K7210.

In order to determine the crystal heat of fusion, crystal melting start temperature (Tms) and crystal melting peak temperature (Tmp), the crystal heat of fusion was measured using a differential scanning calorimeter according to JIS K7121 and K7122, and the melting start temperature and peak temperature were read during the measurement.

The tensile strength and elongation were measured according to JIS K6301. The Tg (glass transition temperature) was measured according to the method described in Kobunshi Jikkengaku [Polymer Experiments] Vol. 12, "Thermodynamic, electrical and optical properties" (Kyoritsu Publishing Co., Ltd.), p. 74-77.

EXAMPLE 1

Pellets of polyethylene NF-364A (density: 0.920, Mw/Mn: 2.0) by JPO Co., Ltd. (obtained by melting, kneading and pelleting polymerized powder) were pulverized to a mean particle size of 0.45 mm (450 μm) using a turbogrinder by Turbo Kogyo Co., Ltd.

Next, 80 L of water, 80 g of sodium alkyldiphenylethersulfonate as a dispersing agent and 80 g of sodium polystyrenesulfonate as an anti-agglomerating agent were added to a 100 L autoclave, and 10 kg of the aforementioned pulverized polyethylene was loaded therein.

The first stage of chlorination was carried out to a chlorine content of 15 wt % at 105° C. The chlorine gas supply was then interrupted, heating to 127° C. was followed by cooling to 110° C., and a second stage of chlorination was carried out to a chlorine content of 28 wt % at a temperature of 110° C. The chlorination was followed by water washing and drying by ordinary procedures to obtain chlorinated polyethylene. The crystal melting start temperature of the chlorinated polyethylene after the heat treatment step conducted between the first stage of chlorination and the second stage of chlorination was 85° C.

A test piece was prepared by adding 2 parts by weight of dioctyltin maleate and 1 part by weight of calcium stearate as stabilizers to 100 parts by weight of the chlorinated polyethylene, kneading the mixture for 5 minutes with a roll at 130° C. and then press molding a test piece at a temperature of 170° C. and a pressure of 200 kg/cm².

EXAMPLES 2-9

Chlorination was carried out in the same manner as Example 1 using the starting materials and conditions shown in Table 1, and the obtained chlorinated polyethylene was used to fabricate a test piece in the same manner as Example 1.

COMPARATIVE EXAMPLE 1

Chlorination was carried out in the same manner as Example 1 except that polyethylene powder with a mean particle size of 400 μm (polymerized powder without melting or kneading) was used as the starting material without pulverization, and the obtained chlorinated polyethylene was used to fabricate a test piece in the same manner as Example 1.

COMPARATIVE EXAMPLE 2

Chlorination was carried out using the same starting materials as Example 1 pulverized to 800 μm, and the obtained chlorinated polyethylene was used to fabricate a test piece in the same manner as Example 1.

COMPARATIVE EXAMPLES 3 AND 4

The polyethylene of the polyethylene pellets used in Example 6 but before pelleting (the polymerized powder) was used as the starting material for Comparative Example 3 and the polyethylene of the polyethylene pellets used in Example 7 but before pelleting (the polymerized powder) was used as the starting material for Comparative Example 4, without melting or kneading, and performing only particle size adjustment by pulverization. The subsequent chlorination was carried out under the same conditions as in the respective examples and test pieces were fabricated.

TABLE 1

| | First step | | | | | | | | Chlorination step conditions | | | | |
| | Melting/ | Starting material properties | | | | | | First step | | Second step | Tms | Third step | |
| | kneading before pulverization | Form before pulverization | Density g/cm³ | Mw/Mn | MFR g/10 min | Mean particle size μm | Tms °C. | Tmp °C. | Temperature °C. | Degree of chlorination wt % | Temperature | after second step | Temperature °C. | Degree of chlorination wt % |
|---|---|---|---|---|---|---|---|---|---|---|---|---|---|---|
| Example 1 | yes | pellet | 0.920 | 2.0 | 1.0 | 450 | 75 | 126 | 105 | 15 | 127 | 85 | 110 | 28 |
| Example 2 | yes | pellet | 0.920 | 2.0 | 1.0 | 420 | 75 | 126 | 105 | 15 | 127 | 86 | 110 | 28 |
| Example 3 | yes | pellet | 0.920 | 2.0 | 1.0 | 100 | 75 | 126 | 105 | 15 | 127 | 88 | 105 | 28 |
| Example 4 | yes | pellet | 0.920 | 2.0 | 1.0 | 100 | 75 | 126 | 105 | 15 | 127 | 88 | 110 | 28 |
| Example 5 | yes | pellet | 0.920 | 2.0 | 4.0 | 400 | 74 | 125 | 105 | 15 | 126 | 87 | 110 | 28 |
| Example 6 | yes | pellet | 0.912 | 2.5 | 2.0 | 440 | 71 | 124 | 105 | 15 | 125 | 86 | 110 | 28 |
| Example 7 | yes | pellet | 0.930 | 2.6 | 1.0 | 400 | 73 | 125 | 105 | 15 | 126 | 87 | 110 | 28 |
| Example 8 | yes | pellet | 0.920 | 2.0 | 1.0 | 450 | 75 | 126 | 110 | 10 | 127 | 88 | 110 | 28 |
| Example 9 | yes | pellet | 0.920 | 2.0 | 1.0 | 450 | 75 | 126 | 105 | 15 | 127 | 85 | 115 | 28 |
| Comp. Ex. 1 | no | powder | 0.920 | 2.0 | 1.0 | 400 | 74 | 126 | 105 | 15 | 127 | 87 | 110 | 28 |
| Comp. Ex. 2 | yes | pellet | 0.920 | 2.0 | 1.0 | 800 | 75 | 126 | 105 | 15 | 127 | 88 | 110 | 28 |
| Comp. Ex. 3 | no | powder | 0.912 | 2.5 | 2.0 | 440 | 71 | 124 | 105 | 15 | 125 | 85 | 110 | 28 |
| Comp. Ex. 4 | no | powder | 0.930 | 2.6 | 1.0 | 400 | 73 | 125 | 105 | 15 | 126 | 86 | 110 | 28 |

The test pieces obtained by the method described above were used for measurement of properties such as crystal heat of fusion, tensile strength, elongation and Tg. The results are shown in Table 2.

TABLE 2

| | Properties of chlorinated product | | | | | |
|---|---|---|---|---|---|---|
| | Crystal heat of fusion J/g | Degree of chlorination wt % | M100 MPa | TB MPa | Elongation % | Tg °C. |
| Example 1 | 1.0 | 28 | 1.20 | 6.06 | ≥1600 | −25 |
| Example 2 | 1.0 | 28 | 1.05 | 4.97 | ≥1600 | −26 |
| Example 3 | 10 | 28 | 1.04 | 3.62 | ≥1600 | −25 |
| Example 4 | 1.0 | 28 | 0.94 | 3.42 | ≥1600 | −26 |
| Example 5 | 1.0 | 28 | 1.20 | 6.00 | ≥1600 | −25 |
| Example 6 | <0.1 | 28 | 0.85 | 5.54 | ≥1600 | −27 |
| Example 7 | 0.5 | 28 | 0.96 | 7.02 | ≥1600 | −25 |
| Example 8 | 1.5 | 28 | 1.09 | 6.25 | ≥1600 | −25 |
| Example 9 | <0.1 | 28 | 0.94 | 6.14 | ≥1600 | −26 |
| Comp. Ex. 1 | 10 | 28 | 1.32 | 8.34 | 1200 | −22 |
| Comp. Ex. 2 | 1.0 | 28 | 2.50 | 10.00 | 1000 | −20 |
| Comp. Ex. 3 | 1.0 | 28 | 1.24 | 6.06 | 1200 | −23 |
| Comp. Ex. 4 | 2.0 | 28 | 1.65 | 7.43 | 1100 | −20 |

The chlorinated polyethylene products obtained in Examples 1 to 9 all had elongation of 1600% or greater in the tensile test and a low 100% modulus, indicating high flexibility. Also, the glass transition temperatures were −25°

C. or below, indicating satisfactory low-temperature flexibility. On the other hand, the chlorinated polyethylene products obtained in the Comparative Examples 1 to 4 had poor flexibility and glass transition temperatures exceeding −25° C., indicating poor low-temperature flexibility.

The following test was also conducted in order to examine the properties of the crosslinked rubber at low temperature.

To 100 parts by weight of the chlorinated polyethylene obtained in each of the examples and comparative examples there were added 10 parts by weight of magnesium oxide (KYOWAMAG 150-1, product of Kyowa Chemical Industry Co., Ltd.), 50 parts by weight of carbon black (SHO-BLACK MAF•G, product of Showa Cabot, KK.) and 40 parts by weight of a plasticizer (SANSOSAIZA-DOS, product of New Japan Chemical Co., Ltd.), and the mixture was kneaded with a Banbury mixer. After then adding 2.5 parts by weight of 1,3,5-trithiocyanuric acid (TCA-D, product of Ouchishinko Chemical Industrial Co., Ltd.) as a crosslinking accelerator and 1.5 parts by weight of a dicyclohexylamine salt of 2-mercaptobenzothiazole (MDCA, product of Ouchishinko Chemical Industrial Co., Ltd.) as a crosslinking agent, the mixture was kneaded with a roll.

For further crosslinking, the kneaded mixture was pressed with a press at 180° C. for 6 minutes and heated in an oven at 150° C. for 3 hours to obtain a sample.

The obtained crosslinked rubber samples were subjected to a cold flex test according to JIS K6261 (Vulcanized Rubber Cold Flex Test), and the $t_2$ temperature, $t_5$ temperature and $t_{10}$ temperature of the relative modulus (RM) were calculated. For measurement of the mechanical fatigue property, pulling at a tension from 0-100% was repeated 10 million times at a rate of 300 times/min using an elongation tester with 10 JIS #3 dumbbells, and the number of broken samples was recorded. A smaller number of broken samples indicates a superior mechanical fatigue property. The compressive set was also measured according to JIS K6301, with 25% compression at 100° C. for 70 hours.

The results are shown in Table 3.

temperature flexibility. The mechanical fatigue properties also indicated superior durability judging from the small number of broken samples.

On the other hand, the crosslinked rubbers of Comparative Examples 1 to 4 had $t_2$, $t_5$ and $t_{10}$ temperatures of or above −25° C., −40° C. and −45° C., respectively, in the cold flex test, indicating poor low-temperature flexibility. Also, the compression sets were greater than 30%, indicating poor balance with low-temperature flexibility, and the mechanical fatigue properties indicated inferior durability judging from the number of half or more broken samples.

INDUSTRIAL APPLICABILITY

The present invention provides chlorinated polyolefins which can be used for the production of crosslinked rubbers and thermoplastic elastomers useful in the field of automobiles, household electrical appliances, building materials and the like.

The invention claimed is:

1. A process for production of a chlorinated polyolefin comprising a step of melting and kneading a polyolefin and then molding it to obtain a solid, a step of pulverizing the solid into powder having a mean particle size of no greater than 500 μm, and a step of chlorinating the powder.

2. A process for production of a chlorinated polyolefin comprising a step of melting and kneading a polyolefin and then molding it to obtain a solid, a step of pulverizing the solid into powder having a mean particle size of no greater than 500 μm, and a step of chlorinating the powder, wherein the chlorinating step further comprises a first step of chlorination at above the crystal melting start temperature and more than 10° C. below the crystal melting peak temperature of the polyolefin starting material as determined by DSC, a second step of interrupting the chlorine supply and performing heat treatment by heating to a temperature which is higher than 5° C. below the crystal melting peak tempera-

TABLE 3

| | Crosslinked rubber properties | | | | |
|---|---|---|---|---|---|
| | Cold flex test | | | | Number of | |
| | $t_2$ temperature ° C. | $t_5$ temperature ° C. | $t_{10}$ temperature ° C. | Freezing point ° C. | broken samples from mechanical fatigue (of 10) | Compression set % |
| Example 1 | −28 | −43 | −49 | −62 | 0 | 29 |
| Example 2 | −32 | −45 | −51 | −64 | 0 | 24 |
| Example 3 | −28 | −45 | −50 | −62 | 0 | 29 |
| Example 4 | −30 | −46 | −52 | −63 | 0 | 25 |
| Example 5 | −28 | −44 | −49 | −61 | 0 | 26 |
| Example 6 | −33 | −48 | −55 | −66 | 0 | 23 |
| Example 7 | −30 | −46 | −51 | −63 | 0 | 26 |
| Example 8 | −30 | −46 | −51 | −63 | 0 | 24 |
| Example 9 | −31 | −47 | −51 | −64 | 0 | 27 |
| Comp. Ex. 1 | −24 | −38 | −42 | −57 | 7 | 38 |
| Comp. Ex. 2 | −23 | −37 | −41 | −56 | 8 | 38 |
| Comp. Ex. 3 | −24 | −39 | −43 | −58 | 10 | 36 |
| Comp. Ex. 4 | −21 | −36 | −39 | −52 | 5 | 37 |

The crosslinked rubbers of the chlorinated polyethylene obtained in Examples 1 to 9 had $t_2$, $t_5$ and $t_{10}$ temperatures of below −25° C., −40° C. and −45° C., respectively, in the cold flex test with the Gehman tester, indicating excellent low-temperature flexibility. Also, the compression sets were below 30%, indicating a satisfactory balance with lowture, and a third step of rechlorination at a temperature above the crystal melting start temperature of the chlorinated polyolefin after the heat treatment step.

3. A process for production of a chlorinated polyolefin according to claim 1 or 2, wherein the polyolefin is polyethylene.

4. A process for production of a chlorinated polyolefin according to claim 3, wherein the polyethylene is linear low-density polyethylene.

5. A process for production of a chlorinated polyolefin according to claim 3, wherein the density of the polyethylene is 0.90-0.93.

6. A process for production of a chlorinated polyolefin according to claim 3, wherein the polyethylene is polyethylene with a weight-average molecular weight (Mw) and number-average molecular weight (Mn) ratio (Mw/Mn) of no greater than 3.0 as measured by gel permeation chromatography.

7. A chlorinated polyolefin produced by a process according to claim 1 or 2, wherein the elongation based on a tensile test is 1500% or greater, and the glass transition temperature is no higher than −25° C.

8. A chlorinated polyolefin according to claim 7, wherein the chlorinated polyolefin has a crystal heat of fusion of no greater than 30 J/g according to DSC.

9. A chlorinated polyolefin according to claim 7, wherein the chlorine content is 15-45 wt %.

10. A chlorinated polyolefin according to claim 7, wherein the chlorinated polyolefin is chlorinated polyethylene.

11. A process for production of a crosslinked chlorinated polyolefin comprising preparing a chlorinated polyolefin crosslinkable composition comprising 100 parts by weight of a chlorinated polyolefin produced by a process according to claim 1 or 2, 0.5-20 parts by weight of an acid accepter, 10-80 parts by weight of reinforcer, 0.5-10 parts by weight of a crosslinking agent and 5-70 parts by weight of a plasticizer, and then kneading and crosslinking the chlorinated polyolefin crosslinkable composition.

12. A chlorinated polyolefin crosslinkable composition comprising 100 parts by weight of a chlorinated polyolefin according to claim 8, 0.5-20 parts by weight of an acid acceptor, 10-80 parts by weight of a reinforcer, 0.5-10 parts by weight of a crosslinking agent and 5-70 parts by weight of a plasticizer.

13. A crosslinked chlorinated polyolefin obtained by crosslinking a chlorinated polyolefin crosslinkable composition according to claim 12.

14. A crosslinked chlorinated polyolefin according to claim 13, wherein the temperature at which the relative modulus (RM)=2 by a cold flex test is no higher than −25° C.

15. A crosslinked chlorinated polyolefin according to claim 13, wherein the temperature at which the relative modulus (RM)=5 by a cold flex test is no higher than −40° C.

16. A crosslinked chlorinated polyolefin according to claim 13, wherein the temperature at which the relative modulus (RM)=10 by a cold flex test is no higher than −45° C.

17. An automobile boot or hose employing a crosslinkable composition according to claim 12.

18. An industrial hose, sheet or packing employing a crosslinkable composition according to claim 12.

19. An automobile boot or hose employing a crosslinked polyolefin according to claim 13.

20. An industrial hose, sheet or packing employing a crosslinked polyolefin according to claim 13.

* * * * *